(12) United States Patent
Ohgose

(10) Patent No.: US 6,650,708 B1
(45) Date of Patent: Nov. 18, 2003

(54) VIDEO SIGNAL ENCODING APPARATUS

(75) Inventor: Hideyuki Ohgose, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 568 days.

(21) Appl. No.: 09/685,118

(22) Filed: Oct. 10, 2000

(30) Foreign Application Priority Data

Oct. 7, 1999 (JP) .......................................... 11-286492

(51) Int. Cl.⁷ ................................................ H04N 7/12
(52) U.S. Cl. ................................................ 375/240.16
(58) Field of Search ...................... 375/240.01, 240.02, 375/240.03, 240.12, 240.16, 240.18, 240.2, 240.23, 240.24, 240.26; 382/232, 236, 238, 239, 244, 246, 248, 250, 251; H04N 7/12

(56) References Cited

U.S. PATENT DOCUMENTS

| 5,845,015 A | 12/1998 | Martucci |
| 5,963,673 A | 10/1999 | Kodama et al. |
| 6,052,415 A | * 4/2000 | Carr et al. .............. 375/240.12 |

FOREIGN PATENT DOCUMENTS

| GB | 2 332 113 | 6/1999 |
| JP | 10-308946 | 11/1998 |

OTHER PUBLICATIONS

A. Vetro et al. "Minimum Drift Architectures for 3–Layer Scalable DTV Decoding", IEEE Transactions On Consumer Electronics, vol. 44, No. 3, Aug. 1998, pp. 527–536.

S. Martucci, "Image Resizing in the Discrete Cosine Transform Domain", Proceedings of the International Conference on Image Processing, vol. 3, Oct. 23, 1995, pp. 244–247.

European Search Report corresponding to application No. EP 00 12 1291 dated Apr. 7, 2003.

* cited by examiner

Primary Examiner—Young Lee
(74) Attorney, Agent, or Firm—RatnerPrestia

(57) ABSTRACT

A video signal encoding apparatus for enlarging a video signal by subjecting it to a coding process. The apparatus, using m×n blocks (m, n: natural number) as the unit block for coding a motion picture, performs DCT calculation and quantization, and, then, converting the block into s×t blocks (s, t: natural number), performs variable length coding. Thus, the apparatus generates compressed data of an enlarged motion picture and delivers the enlarged output. In the local decoder of the apparatus, it is switch selected by a switcher whether m×n inverse quantization coefficients, obtained by inverse quantization, are to be decoded by an s×t IDCT unit or by an m×n IDCT unit, in accordance with the accuracy in motion compensation. Further, the apparatus has a resizing unit for adjusting a motion-compensated reference picture to the picture size of an input image. The video signal encoding apparatus performs the encoding by enlarging a motion picture in a frequency domain so that the amount of data calculation in the encoding is decreased and deterioration in picture quality is suppressed.

17 Claims, 5 Drawing Sheets

VIDEO SIGNAL ENCODING APPARATUS

FIELD OF THE INVENTION

The present invention relates to a video signal encoding apparatus for enlarging a video signal through a coding process.

BACKGROUND OF THE INVENTION

In encoding images, such situations frequently occur in which it is required to enlarge moving pictures. When an input moving picture is encoded after it is enlarged, we consider that the picture is first enlarged in a spatial domain and then encoded. In this case, such processes as discrete cosine transform (DCT) are performed subsequent to the enlargement of the picture. Accordingly, the volume of calculation required for encoding increases as compared with that where the image is not enlarged.

A video signal encoding apparatus capable of encoding an input moving picture after enlarging it, while avoiding the problem just described of increase in the volume of calculation, is disclosed in Japanese Non-examined Publication No. H10-308946. An example of the video signal encoding apparatus performing encoding after enlargement of an input moving picture is shown in FIG. 5. This apparatus is described in the case of doubling an input picture in the vertical direction.

Block converter 502 divides input image 501 into 8×4 blocks formed of eight horizontal pixels and four vertical lines. Inter-frame prediction unit 503 performs inter-frame prediction with the use of the divided 8×4 blocks and reference picture generated by reference picture replacing unit 508 and generates 8×4 differential blocks and motion vectors. When inter-frame prediction is not performed, 8×4 blocks generated in block converter 502 comes to be 8×4 differential blocks.

Then, 8×4 DCT coefficient blocks are generated from 8×4 differential blocks by DCT unit 504. Quantizer 505 quantizes 8×4 DCT coefficient blocks to generate 8×4 quantization coefficient blocks. Inverse quantizer 506 inverse-quantizes 8×4 quantization coefficient blocks to generate 8×4 inverse quantization coefficients blocks.

Further, inverse discrete cosine transform (IDCT) unit 508 performs IDCT processing on 8×4 inverse quantization coefficient blocks to generate 8×4 decoded blocks. Reference picture replacing unit 508 updates the reference picture with the use of 8×4 decoded blocks and motion vectors generated in inter-frame prediction unit 503.

Vertical doubling unit 509 enlarges 8×4 quantization coefficient blocks, obtained through quantization processing, in a frequency domain to generate 8×8 quantization coefficient blocks. Thus, the size in the vertical direction of the block becomes double that of the input picture.

Variable length coding (VLC) unit 510 performs variable length coding processing on 8×8 quantization coefficient blocks to generate compressed data 511.

By subjecting data first to DCT and quantization processing and then encoding the obtained data in a frequency domain as described in the above example, the amount of data calculation required for the picture coding is reduced from that where the input picture is first enlarged and then encoded.

In the example described above, the size of the block subjected to IDCT processing in the local decoder is 8×4. On the other hand, when a decoding apparatus, which has received the output of the compressed data from this apparatus, decodes the compressed data, IDCT processing is performed on 8×8 blocks as a unit. Namely, the size of the blocks subjected to IDCT processing in the former apparatus, i.e., the encoding apparatus for encoding an image, is different from the size of the blocks subjected to IDCT processing in the latter apparatus, the decoding apparatus receiving the encoded data and decoding the received data. Due to the difference in the size of blocks, errors occur in the frame subjected to the inter-frame predictive processing between the image encoded and the image decoded. Especially, errors accumulate at the edge portions of the image and this causes distortion of the image or color registration error.

SUMMARY OF THE INVENTION

The object of the present invention is the provision of a video signal encoding apparatus enlarging the image in a frequency domain when performing encoding of a motion picture thereby reducing the amount of data calculation required for the encoding and suppressing deterioration in image quality.

The video signal encoding apparatus of the present invention performs DCT calculation and quantization with the use of m×n block (m, n: natural number) as the unit block for coding a motion picture and, then, converting the block into s×t block (s, t: natural number, $s \geq m$, $t \geq n$), performs variable length coding. Thus, the apparatus generates compressed data of an enlarged motion picture and delivers the enlarged output.

In the local decoder of the apparatus, it is selected by a switcher whether m×n inverse quantization coefficients, obtained by inverse quantization, are to be decoded by an s×t IDCT unit or by an m×n IDCT unit, in accordance with the accuracy in motion compensation.

Further, the apparatus has a resizing unit for adjusting a motion-compensated reference picture to the picture size of an input image.

In another embodiment of the invention, the apparatus has the same configuration as that of the above described embodiment except that the local decoder in this apparatus decodes m×n inverse quantization coefficients, obtained by inverse quantization, in an s×t IDCT unit.

Having the described configuration, the video signal encoding apparatus performs the encoding by enlarging a motion picture in a frequency domain so that the amount of data calculation in the encoding is decreased and deterioration in picture quality is suppressed.

DESCRIPTION OF THE PREFERRED EMBODIMENTS

Exemplary embodiments of the present invention will be described with reference to the accompanying drawings.

Embodiment 1

Figure 1:
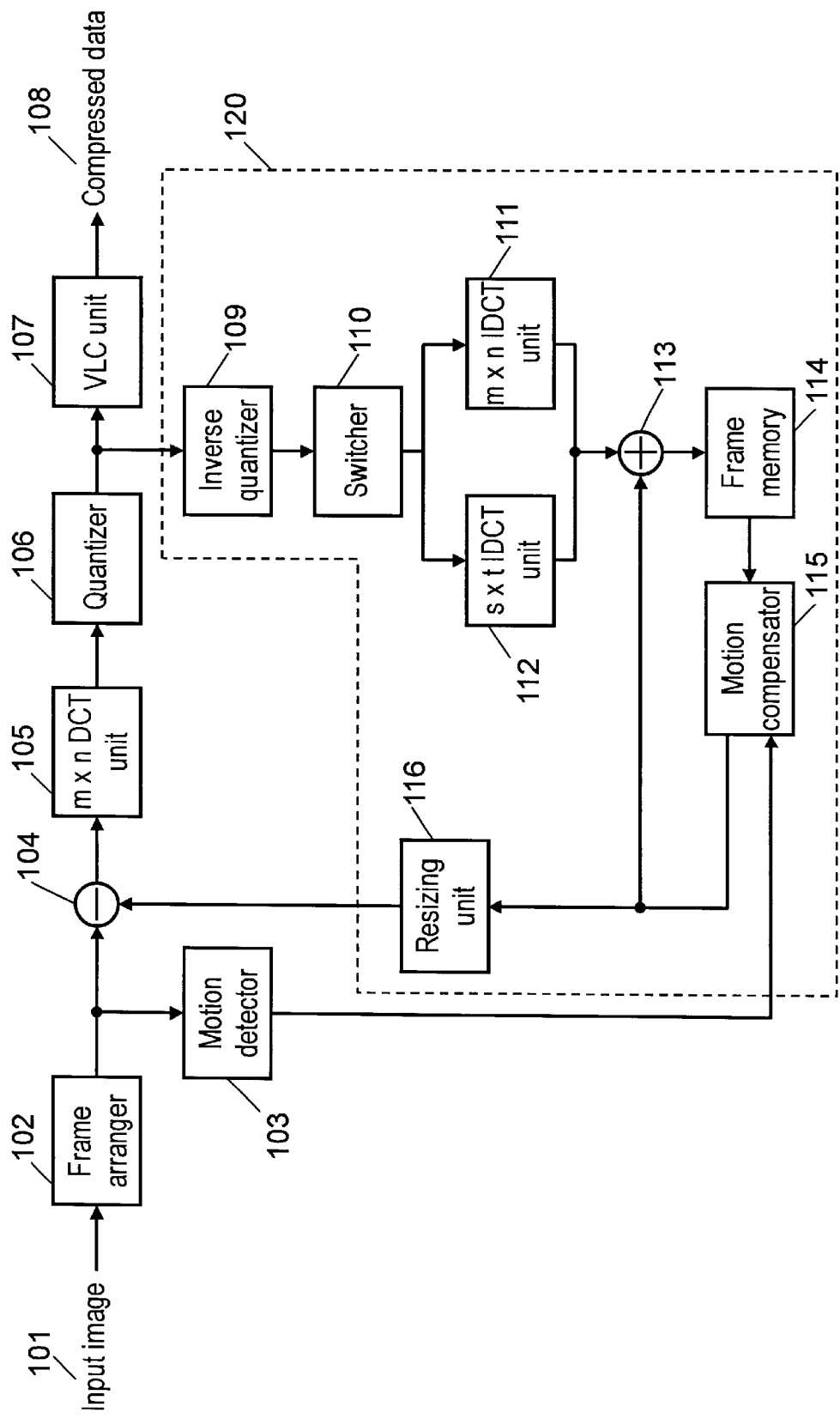
FIG. 1 is a block diagram showing a video signal encoding apparatus according to embodiment 1 of the invention.

Referring to FIG. 1, the video signal encoding apparatus of the invention comprises frame arranger 102, motion detector 103, subtractor 104, m×n DCT unit 105, quantizer 106, VLC unit 107, and local decoder 120. Local decoder 120 comprises inverse quantizer 109, switcher 110, m×n IDCT unit 111, s×t IDCT unit 112, adder 113, frame memory 114, motion compensator 115, and resizing unit 116. The video signal encoding apparatus processes input image 101 to output compressed data 108. Operation of the apparatus will be described below.

Here, the case where the format of compressed data 108 as the output is that of MPEG and an input image is doubled in both vertical and horizontal directions (m=n=4, s=t=8) will be described. Frame arranger 102 rearranges input image 101 in the order of coding.

Motion detector 103 obtains motion vectors by using the rearranged image only when the image as the object of encoding is subjected to motion-compensation by inter-frame prediction.

The size of the output image is double the size of the input image both in the vertical and horizontal directions. Accordingly, the value of the motion vector in compressed data 108 is adapted to become double the value of the motion vector obtained as above both in vertical and horizontal directions.

Subtractor 104 obtains the differential between the picture subjected to inter-frame prediction and the reference picture decoded by local decoder 120 to generate differential data.

m×n DCT unit 105 divides intra-frame predictive coding picture, or differential data, into 4×4 blocks formed of four horizontal pixels and four vertical lines and, thereupon, performs two-dimensional four-point DCT calculation on the same to generate 4×4 DCT coefficients.

Quantizer 106 quantizes the 4×4 DCT coefficients to obtain 4×4 quantization coefficients. For the quantization at this time, a matrix of 4×4 elements on the lower-order components of the 8×8 quantization matrix is used.

VLC unit 107 converts 4×4 quantization coefficients into 8×8 quantization coefficients and applies variable length coding to the 8×8 quantization coefficients and such information as motion vectors required for coding, and thereby outputs compressed data 108. Here, 4×4 quantization coefficients are used as data of lower-order components of 8×8 quantization coefficients, that is, data of higher-order components of 8×8 quantization coefficients are set to zeros so that 4×4 quantization coefficients are converted into 8×8 quantization coefficients.

Thus, the input image is doubled both vertically and horizontally in compressed data 108.

Inverse quantizer 109 inverse-quantizes 4×4 quantization coefficients to obtain 4×4 inverse quantization coefficients. Here, in the same way as in quantizer 106, inverse quantization is performed by using 4×4 matrix on the lower-order components of 8×8 quantization matrix.

Switcher 110 outputs data of 4×4 inverse quantization coefficients to m×n IDCT unit 111 or s×t IDCT unit 112 depending on the condition of motion detection and the like. Description will be given later as to the switching condition.

m×n IDCT unit 111 performs two-dimensional four-point IDCT calculation on the 4×4 inverse quantization coefficients to generate 4×4 block data.

s×t IDCT unit 112, treating the 4×4 inverse quantization coefficients as data on the lower-order components, performs two-dimensional eight-point IDCT calculation on the same to generate 8×8 block data.

Switcher 110 switches the output of inverse quantizer 109 over to m×n IDCT unit 111 or s×t IDCT unit 112 in the manner as described below.

The switching condition of switcher 110 will now be described.

The description will be made taking the case where the picture format, for example, is 4:2:0.

(1) Switcher 110, when the motion vector obtained in motion detector 103 is of one pel accuracy, outputs the inverse quantized data for luminance component to m×n IDCT unit 111 (so that the data is inverse-converted to 4×4 block data) and outputs the inverse quantized data for color difference component to s×t IDCT unit 112 (so that the data is inverse-converted to 8×8 block data).

(2) Switcher 110, when the motion vector obtained in motion detector 103 is of half pel accuracy, outputs the inverse quantized data for both luminance component and color difference component to s×t IDCT unit 112, and s×t IDCT unit 112 in turn generates 8×8 block data.

The switching condition of switcher 110 will be decried below in more detail.

(1) When the motion vector is to be obtained at one pel accuracy, since motion vectors doubled in both vertical and horizontal directions are used in compressed data 108, motion compensation at two pel accuracy is required.

When luminance component is motion-compensated at two pel accuracy, color difference component is motion-compensated at one pel accuracy by scaling up the motion vector for luminance component.

At this time, luminance component requires motion compensation at two pel accuracy in 8×8 block. This is virtually equivalent to motion compensation at one pel accuracy in 4×4 block.

On the other hand, since color difference component requires motion compensation at one pel accuracy in 8×8 block, the local decoder also generates 8×8 block and, by using the same, performs motion compensation at one pel accuracy.

(2) When the motion vector is to be obtained at half pel accuracy, luminance component in compressed data 108 requires motion compensation at one pel accuracy. When luminance component is motion-compensated at one pel accuracy, color difference component is motion-compensated at half pel accuracy. At this time, luminance component requires motion compensation at one pel accuracy in 8×8 block and color difference component requires motion compensation at half pel accuracy in 8×8 block. Accordingly, the local recorder also generates 8×8 block and performs motion compensation by using the same.

(3) When the motion vector is to be obtained at ¼ pel accuracy, motion compensation at half pel accuracy is required in compressed data 108. At this time, since half pel accuracy is required in 8×8 block for both luminance signal and color difference signal, it is required that the local decoder also generate 8×8 block and make motion compensation by using the same.

Below, errors of decoded image will be considered that are produced between, for example, an encoding apparatus and a decoding apparatus, receiving the encoded data therefrom and decoding the same, when the size of the block in which IDCT is performed is different between the encoding apparatus and the decoding apparatus.

Here, as an example, the difference between the case where motion compensation is performed at half pel accuracy in 4×4 block data and the case where motion compensation is made at one pel accuracy in 8×8 block data will be described.

Figure 2:
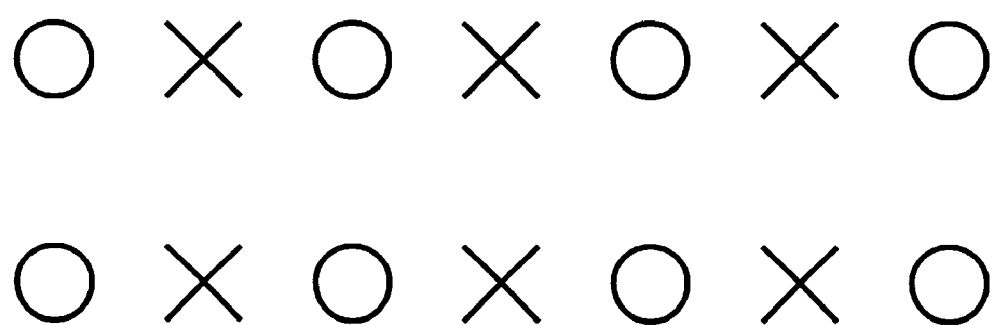
FIG. 2 is a diagram showing a method of producing pixel data when motion compensation is made.

First, description about motion compensation will be made with reference to FIG. 2. When compensation at one pel accuracy is made, a reference picture for motion compensation is generated with the use of pixels of one pel accuracy shown in FIG. 2 (indicated by 0). When compensation at half pel accuracy is made, the mean value of two horizontally adjoining circles (0) is taken as the pixel at half pel accuracy (indicated by ×). Although compensation at half pel accuracy in the horizontal direction is illustrated in FIG. 2, motion compensation is made also in vertical or oblique direction with the use of mean, values of two points or four points of pixels.

Figure 3A:
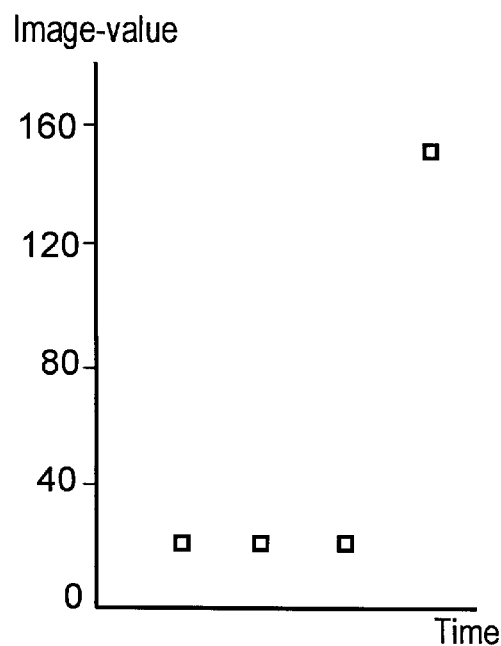
FIG. 3A and FIG. 3B are graphs showing difference between four-point IDCT and eight-point IDCT.

Taking an example where, for simplicity, one-dimensional four-point data (given by 20, 20, 20, 150) is used as input data, the reason why errors accumulate due to difference in number of orders in IDCT will be described by using FIG. 3A and FIG. 3B.

(1) As described above, when motion compensation at half pel accuracy is made for 4×4 block data, motion compensation at one pel accuracy is required to be made for 8×8 block data. Referring to FIG. 3A, four-point DCT is performed on four point input data indicated by (20, 20, 20, 150) and, thereby, four-point DCT coefficients are generated. Four-point IDCT is performed on the same to generate four-point DCT coefficients. The data are indicated as four-point IDCT data 0 in the output data shown in FIG. 3B. The mean values of adjoining two points of four-point IDCT data are indicated by output data Δ in FIG. 3B. Then, eight-point IDCT is performed by having zeros added to the higher-order components of the four-point DCT coefficients and eight-point IDCT coefficients are obtained by conversion. The thus generated eight-point IDCT data are indicated by output data×in FIG. 3B.

Figure 3B:
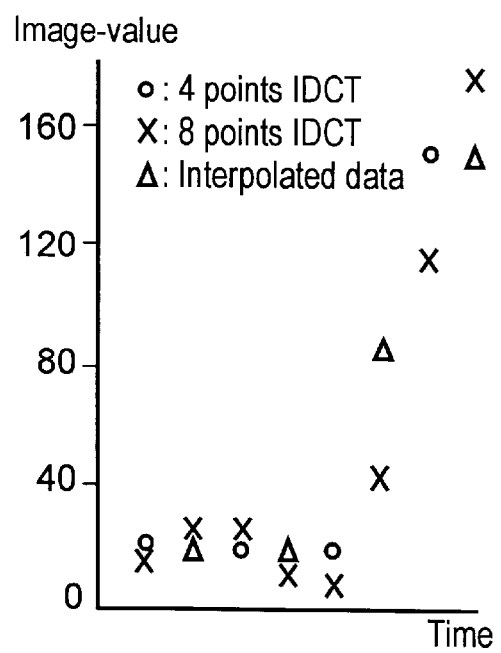

(2) Then, on the basis of the output data shown in FIG. 3B, four-point IDCT calculation 0 and eight-point IDCT calculation ×will be compared and what is known therefrom will be considered.

It is known that eight-point IDCT data×seem to have such values as obtained by applying predictive filtering to data of four-point IDCT calculation 0. When four-point DCT calculation is performed on step-formed data as shown in the example and eight-point IDCT calculation with zeros added to the higher-order components is performed, it is known that the data takes on a form causing an overshoot. Further, when the mean value of each combination of two points from the left is taken, each mean value has virtually equal value to each of four-point IDCT data.

(3) The reason why errors accumulate will now be described. As illustrated in FIG. 3B, when motion compensation at half pel accuracy is performed by obtaining the mean value with the use of four-point IDCT data, the data indicated by Δ at the right-hand end of FIG. 3B is the mean value of the data at the left-hand end of four-point IDCT data of the block (not shown) adjoining the four-point IDCT block shown in FIG. 3B and the data of the four-point IDCT data indicated by 0 at the right-hand end of FIG. 3B. In this case, no overshoot is produced as in eight-point IDCT data.

In this example, the difference between the data at the right-hand end of the four-point IDCT data, in FIG. 3B, and the data at the right-hand end of the eight-point IDCT data, or the difference between the second data from the right of the four-point IDCT data and the fourth data from the right of the eight-point IDCT data constitutes the error between the four-point IDCT data and the eight-point IDCT data.

The phenomena as described above can occur also in the case of two-dimensional data.

When IDCT in local decoder 120 is two-dimensional four-point IDCT and IDCT in the system decoding compressed data 108 is two-dimensional eight-point IDCT, errors occur as with the above described case between IDCT data in local decoder 120 and IDCT data in the decoding apparatus decoding compressed data received thereby.

Description as to what effects these phenomena cause on the picture will now be made. When there is no motion in the picture, the errors as described above are not conspicuous in the decoded output by the decoding apparatus. However, when an edge portion of luminance data has moved, an error occurs at the edge portion of the IDCT data in a first predictive coded picture (P picture) due to the difference between IDCT data in the coding apparatus and IDCT data in the decoding apparatus as described above. The error causes the picture to appear as if it has double edges. Further, on the next P picture, another error accumulates at the double-edge portion so that the picture is caused to appear as if it has triple edges. Such a thing is repeated and eventually a state is brought about in which the edge has errors corresponding to the number of the P pictures. The same phenomena occur also with color registration, namely, an edge portion in the color component comes to have doubled edges, tripled edges, and so on. This causes the picture to look that it has produced a chromatic blur or a color registration error.

Then, if 8×8 IDCT calculation is performed in s×t IDCT unit 112 on luminance data or color difference data subjected to motion compensation at half pel accuracy, the operation of IDCT in the local decoder and the operation of IDCT in decoding compressed data 108 agree with each other. As a result, IDCT data in the local decoder and IDCT data in the decoder match with each other and, therefore, a chromatic blur or a color registration error as described above can be eliminated.

Adder 113 adds 4×4 block data or 8×8 block data of one picture when an inter-frame predictive picture is subjected to local decoding and a reference picture compensated for motion to generate a new reference picture.

Frame memory 114 stores 4×4 block data or 8×8 block data of one picture to be subjected to intra-frame predictive coding or a new reference picture generated in adder 113.

Motion compensator 115 makes motion compensation for the reference picture of a picture to be encoded, by using motion vectors detected by motion detector 103. At this time, motion compensation for 4×4 block data is made by using the motion vectors detected by motion detector 103 as they are. For 8×8 block data, motion compensation is made by using motion vectors doubled in both vertical and horizontal directions.

Resizing unit 116 reduces the motion-compensated reference picture from 8×8 block data to 4×4 block data in conformity with the size of input image 101. To reduce the size at this time, 8×8 block data are divided into divisions each thereof being 2×2 block and the mean value of the four points is taken.

While the format in compressed data 108 was set to be MPEG in the foregoing description, similar arrangement is applicable to H. 261, H. 263, or other coding system including intra-frame predictive coding and inter-frame predictive coding in combination.

Although the case where m=n=4 and s=t=8 was described above, similar encoding of an input image and enlargement of the size is possible even if other combinations of m, n, s, and t are used.

Further, as described above, when 4×4 quantization coefficients are converted into 8×8 quantization coefficients in VLC unit 107, the conversion can be attained by setting 4×4 quantization coefficients as the data on the lower-order components of 8×8 quantization coefficients and forming the data on the higher-order components by zeros.

Further, instead of allowing it to be made in VLC unit 107, the conversion of 4×4 quantization coefficients into 8×8 quantization coefficients by setting 4×4 quantization coefficients as the data on the lower-order components of 8×8 quantization coefficients and forming the data on the higher-order side by zeros may be made in quantizer 106.

Further, instead of allowing it to be made in VLC unit 107, setting of 4×4 quantization coefficients to be the data on the lower-order components of 8×8 quantization coefficients and forming the data on the higher-order components by zeros thereby producing 8×8 DCT coefficients may be made at the output of m×n DCT unit 105.

Further, fast processing algorithm may be used for m×n DCT unit 105, m×n IDCT unit 111, and s×t IDCT unit 112.

Embodiment 2

Figure 4:
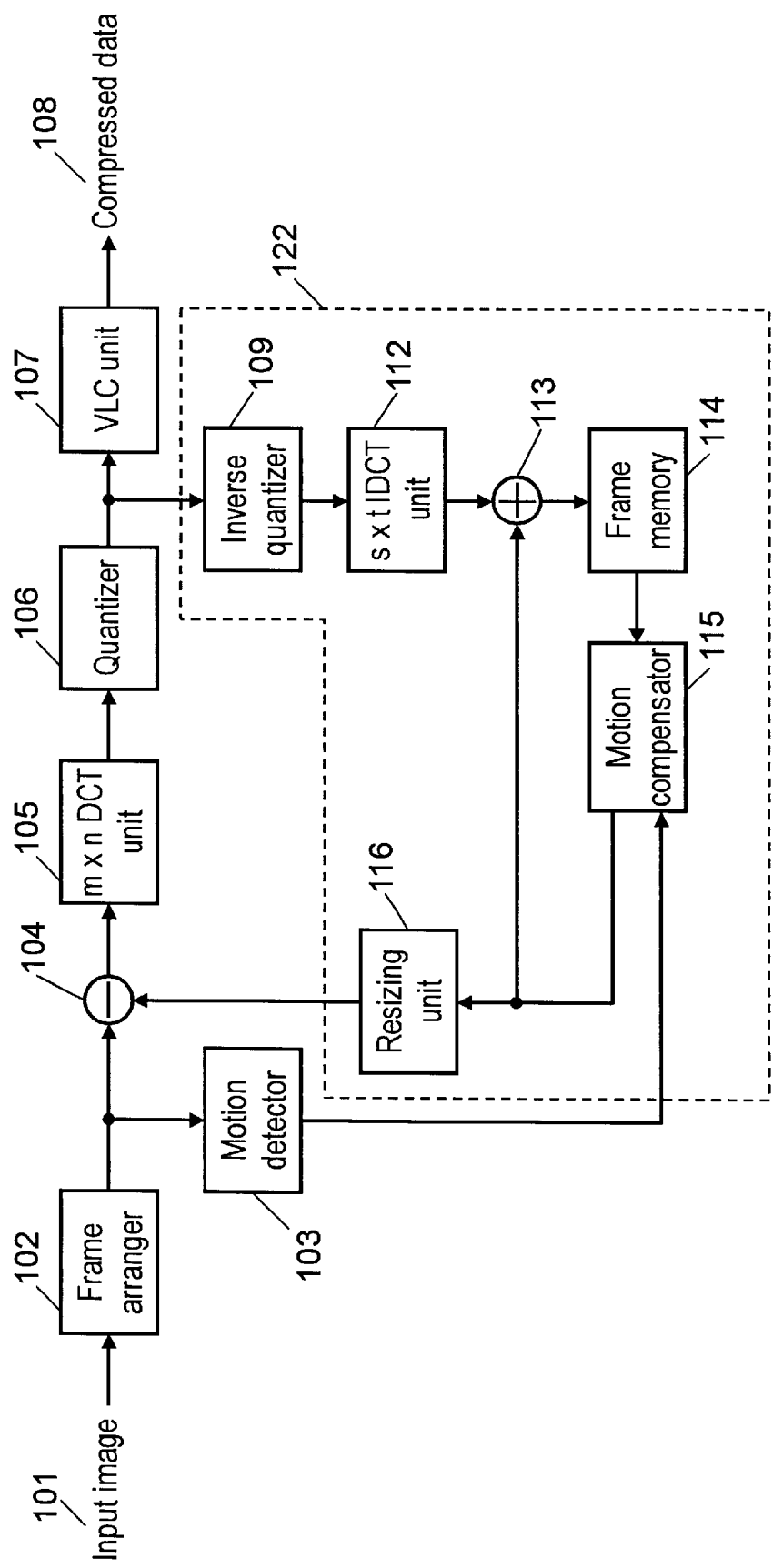
FIG. 4 is a block diagram showing a video signal encoding apparatus according to embodiment 2 of the invention.
Figure 5:
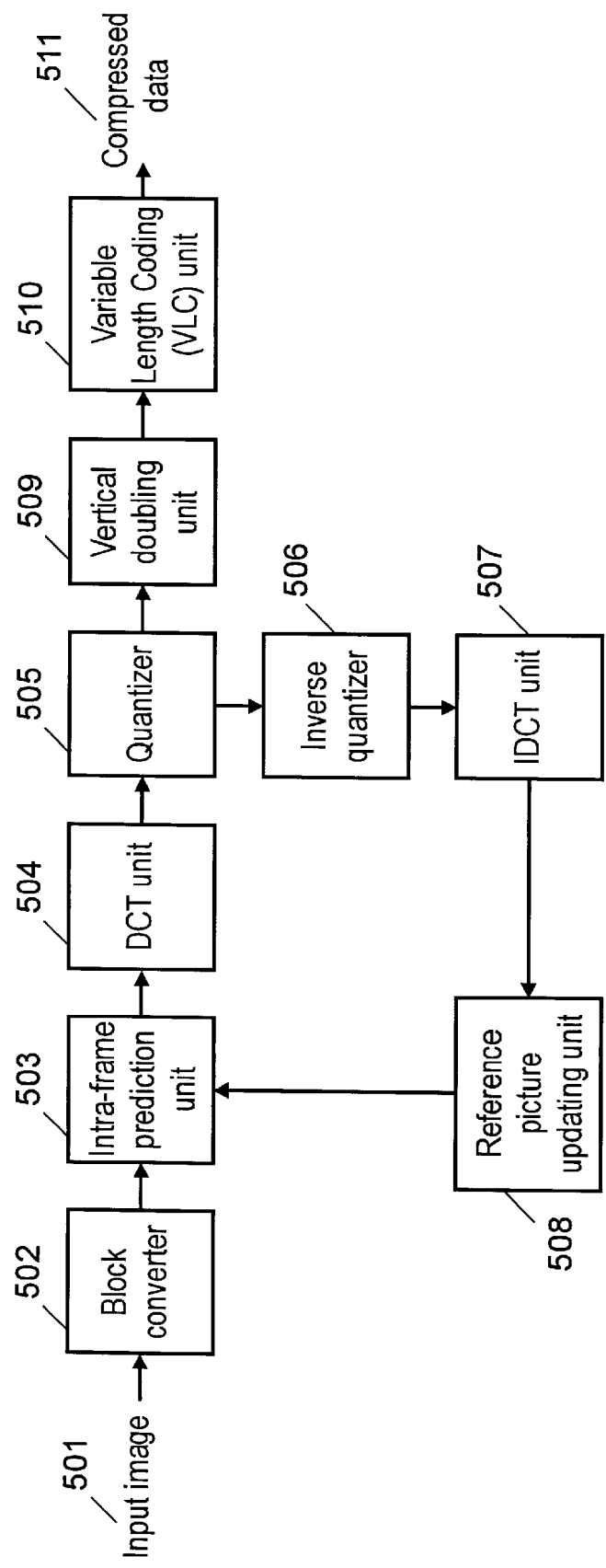
FIG. 5 is a block diagram showing a video signal encoding apparatus of a prior art.

Referring to FIG. 4, the video signal encoding apparatus of the present invention comprises frame arranger 102, motion detector 103, subtractor 104, m×n DCT unit 105, quantizer 106, VLC unit 107, and local decoder 122. Local decoder 122 comprises inverse quantizer 109, s×t IDCT unit 112, adder 113, frame memory 114, motion compensator 115, and resizing unit 116. The video signal encoding apparatus processes input image 101 and outputs compressed data 108. Except for switcher 110 and m×n IDCT unit 111, the configuration of embodiment 2 is the same as the configuration of embodiment 1. Hence, points which are different from the configuration of embodiment 1 will be mainly described.

The same as in embodiment 1, the case where the format of compressed data 108 as the output is MPEG and the input image is turned into an image doubled in both vertical and horizontal directions (m=n=4, s=t=8) will be described.

Here, s×t IDCT unit 112 generates 8×8 block data from 4×4 quantization coefficients irrespective of the accuracy in motion detection by motion detector 103 and for both luminance data and color difference data.

Motion compensator 115 performs motion compensation with the use of vectors obtained by doubling the motion vectors detected in motion detector 103 both in vertical and horizontal directions.

Resizing unit 116 reduces, the same as in embodiment 1, the size of the reference picture compensated for motion from 8×8 block data to 4×4 block data in conformity with the size of input image 101. To reduce the size at this time, 8×8 block data are divided into divisions each thereof being 2×2 block and the mean value of the four points is taken.

Operations of other components of the apparatus also are the same as in embodiment 1.

While the format in compressed data 108 was set to be MPEG in the foregoing description, similar arrangement is applicable to H. 261, H. 263, or other coding system including intra-frame predictive coding and inter-frame predictive coding in combination.

Although the case where m=n=4 and s=t=8 was described above, similar coding of an input image and enlargement of the size is possible even if other combinations of m, n, s, and t are used.

Further, fast algorithm may be used for m×n DCT unit 105 and s×t IDCT unit 112.

According to the video signal encoding apparatus of embodiment 1 of the invention, the amount of data calculation in the coding process can be decreased by enlarging an input image in a frequency domain than in coding the image after it is enlarged. By changing the system in the local decoder in accordance with the accuracy of motion compensation, picture quality can be prevented from being deteriorated and the amount of data calculation in the coding process can be decreased further.

According to the video signal encoding apparatus of embodiment 2 of the invention, the amount of data calculation in the coding process can be decreased by enlarging an input image in a frequency domain and, further, picture quality can be prevented from being deteriorated irrespective of the accuracy in the motion compensation.

What is claimed is:

1. A video signal encoding apparatus for encoding a video signal, said apparatus comprising:

(a) a frame arranger for rearranging an input image in the order of coding;

(b) a motion detector for detecting motion vectors in a picture supplied from said frame arranger;

(c) a subtractor for outputting the differential between said picture and a first reference picture as differential data;

(d) an m×n Discrete Cosine Transform (DCT) unit for dividing said picture or the differential data into m×n blocks, m and n being natural numbers, and generating m×n DCT coefficients;

(e) a quantizer for quantizing the m×n DCT coefficients to obtain m×n quantization coefficients;

(f) a Variable-Length Coding (VLC) unit for converting the m×n quantization coefficients into s×t quantization coefficients, s and t being natural numbers, s being equal to or greater than m, and t being equal to or greater than n, and applying variable length coding to the s×t quantization coefficients and such information as the motion vectors thereby generating compressed data of a picture altered in shape from said picture;

(g) an inverse quantizer for inverse-quantizing the m×n quantization coefficients to obtain inverse quantization coefficients;

(h) a switcher for allowing the inverse quantization coefficients supplied from said inverse quantizer to be switched to either of two outputs thereof;

(i) an m×n IDCT unit for generating m×n block data from the inverse quantization coefficients supplied from said switcher;

(j) an s×t IDCT unit for generating s×t block data from the inverse quantization coefficients supplied from said switcher;

(k) an adder for generating a second reference picture from the s×t block data or the m×n block data and the first reference picture;

(l) a frame memory for storing the second reference picture;

(m) a motion compensator for making motion compensation for the second reference picture with the use of the motion vectors and outputting the motion-compensated first reference picture; and (n) a resizing unit for altering the size of the first reference picture to the size of the input image.

2. The video signal encoding apparatus according to claim 1, wherein
said switcher selectively outputs the inverse quantization coefficients to said m×n IDCT unit or said s×t IDCT unit in accordance with the accuracy of motion detection in said motion detector and the scales of alteration in shape vertically and horizontally of the altered image from said picture.

3. The video signal encoding apparatus according to claim 1, or 2, wherein
said motion compensator, in making motion compensation for the s×t block data generated in said s×t IDCT unit, uses motion vectors obtained by multiplying the motion vectors detected by said motion detector by s/m vertically and by t/n horizontally.

4. The video signal encoding apparatus according to claim 1, or 2, wherein
said resizing unit multiplies the size of the first reference picture by m/s vertically and by n/t horizontally.

5. The video signal encoding apparatus according to claim 1, wherein
said m×n DCT unit generates 4×4 DCT coefficients.

6. The video signal encoding apparatus according to claim 1, wherein
said VLC unit generates 8×8 quantization coefficients.

7. The video signal encoding apparatus according to claim 1, wherein
said VLC unit generates 8×8 quantization coefficients by adding zeros to the higher-order components of the m×n quantization coefficients.

8. The video signal encoding apparatus according to claim 2, wherein
said switcher, when said motion detector makes motion detection at one pel accuracy, outputs m×n IDCT coefficients
to said m×n IDCT unit for luminance components and
to said s×t IDCT unit for color difference components.

9. The video signal encoding apparatus according to claim 3, wherein
said resizing unit multiplies the size of the first reference picture by m/s vertically and by n/t horizontally.

10. The video signal encoding apparatus according to claim 3, wherein
said s×t IDCT unit generates 8×8 block data.

11. The video signal encoding apparatus according to claim 4, wherein
said resizing unit multiplies the 8×8 block data generated by said s×t IDCT unit, after it is motion-compensated in said motion compensator, by ½ in both vertical and horizontal directions.

12. The video signal encoding apparatus according to claim 4, wherein the number denoted by m and n is 4 and the number denoted by s and t is 8.

13. The video signal encoding apparatus according to claim 8, wherein
said m×n IDCT unit generates 4×4 block data and
said s×t IDCT unit generates 8×8 block data.

14. The video signal encoding apparatus according to claim 8, wherein
the number denoted by m and n is 4 and the number denoted by s and t is 8.

15. The video signal encoding apparatus according to claim 9, wherein
said resizing unit multiplies the 8×8 block data generated by said s×t IDCT unit, after it is motion-compensated in said motion compensator, by ½ in both vertical and horizontal directions.

16. The video signal encoding apparatus according to claim 9, wherein
the number denoted by m and n is 4 and the number denoted by s and t is 8.

17. The video signal encoding apparatus according to claim 10, wherein
said motion compensator, in making motion compensation for the 8×8 block data, uses motion vectors obtained by doubling, in both vertical and horizontal directions, the motion vectors detected by said motion detector.

* * * * *

UNITED STATES PATENT AND TRADEMARK OFFICE
CERTIFICATE OF CORRECTION

PATENT NO. : 6,650,708 B1
DATED : November 18, 2003
INVENTOR(S) : Hideyuki Ohgose It is certified that error appears in the above-identified patent and that said Letters Patent is hereby corrected as shown below:

<u>Title page,</u>
Item [54], Title, should read -- VIDEO SIGNAL ENCODING APPARATUS FOR ENLARGING A VIDEO SIGNAL IN ACCORDANCE WITH THE ACCURACY IN MOTION COMPENSATION --

<u>Column 8,</u>
Line 64, "the" should read -- a --.

<u>Column 10,</u>
Lines 6 and 25, "the" has been deleted.

Signed and Sealed this

Twenty-fifth Day of May, 2004

JON W. DUDAS
*Acting Director of the United States Patent and Trademark Office*